United States Patent Office.

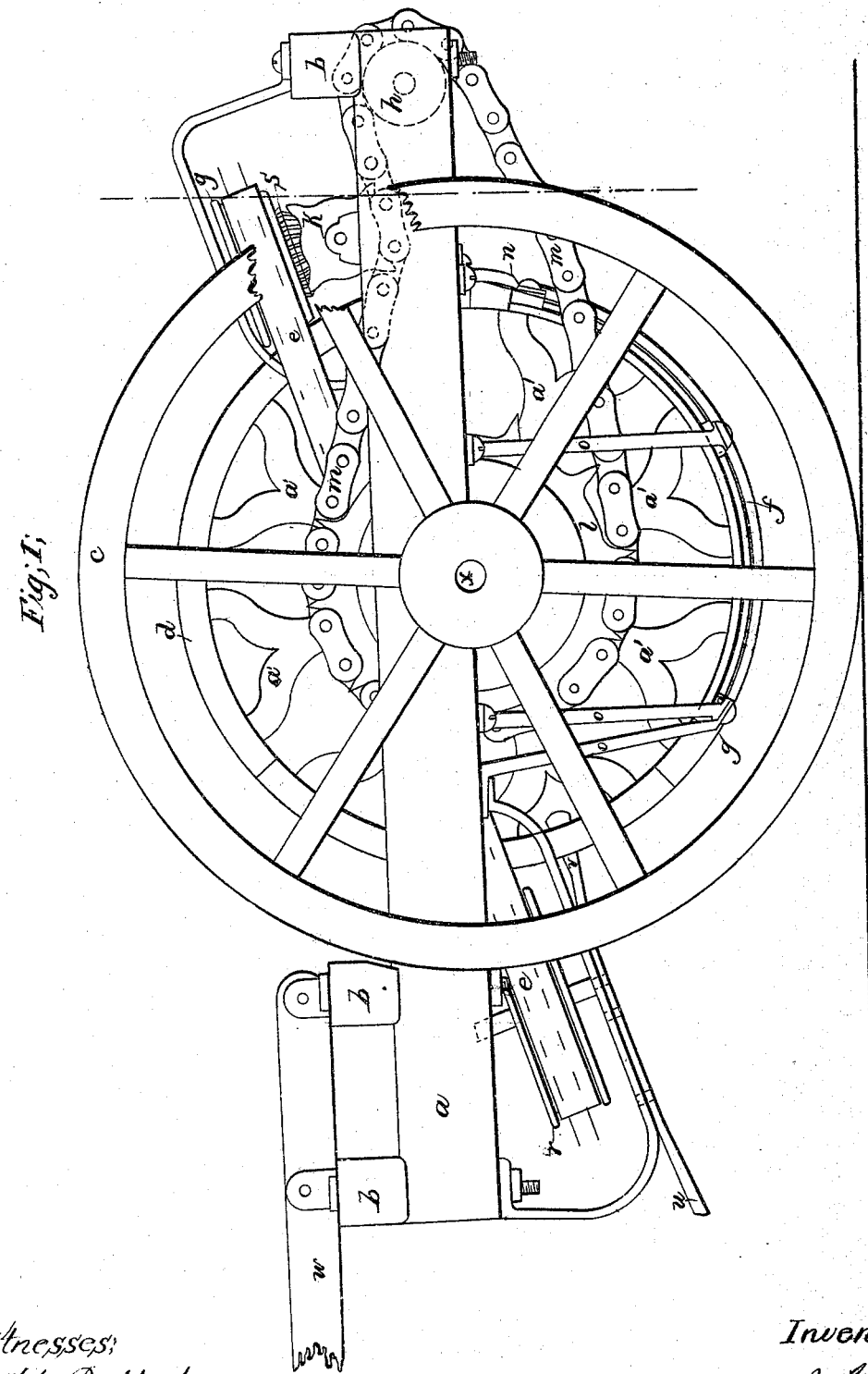

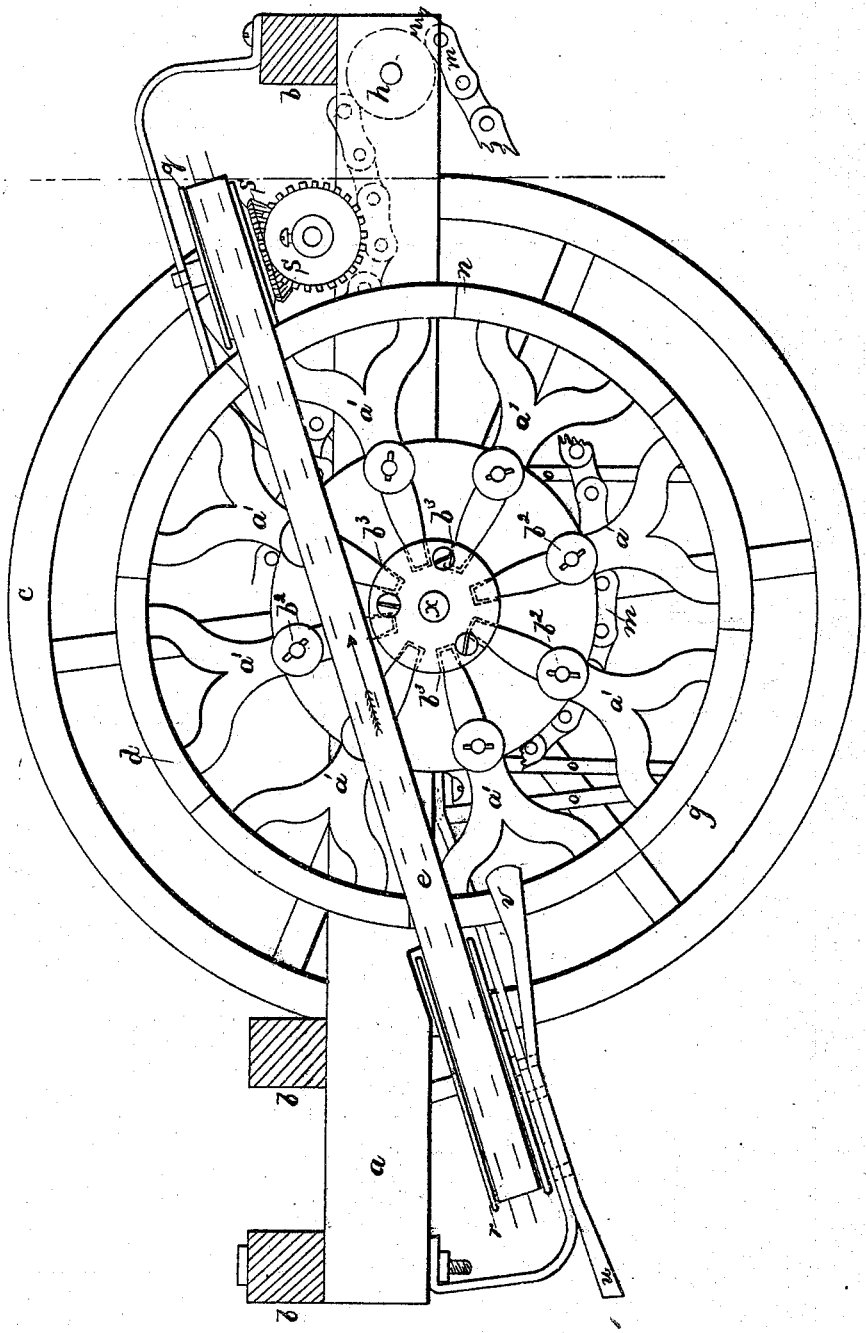

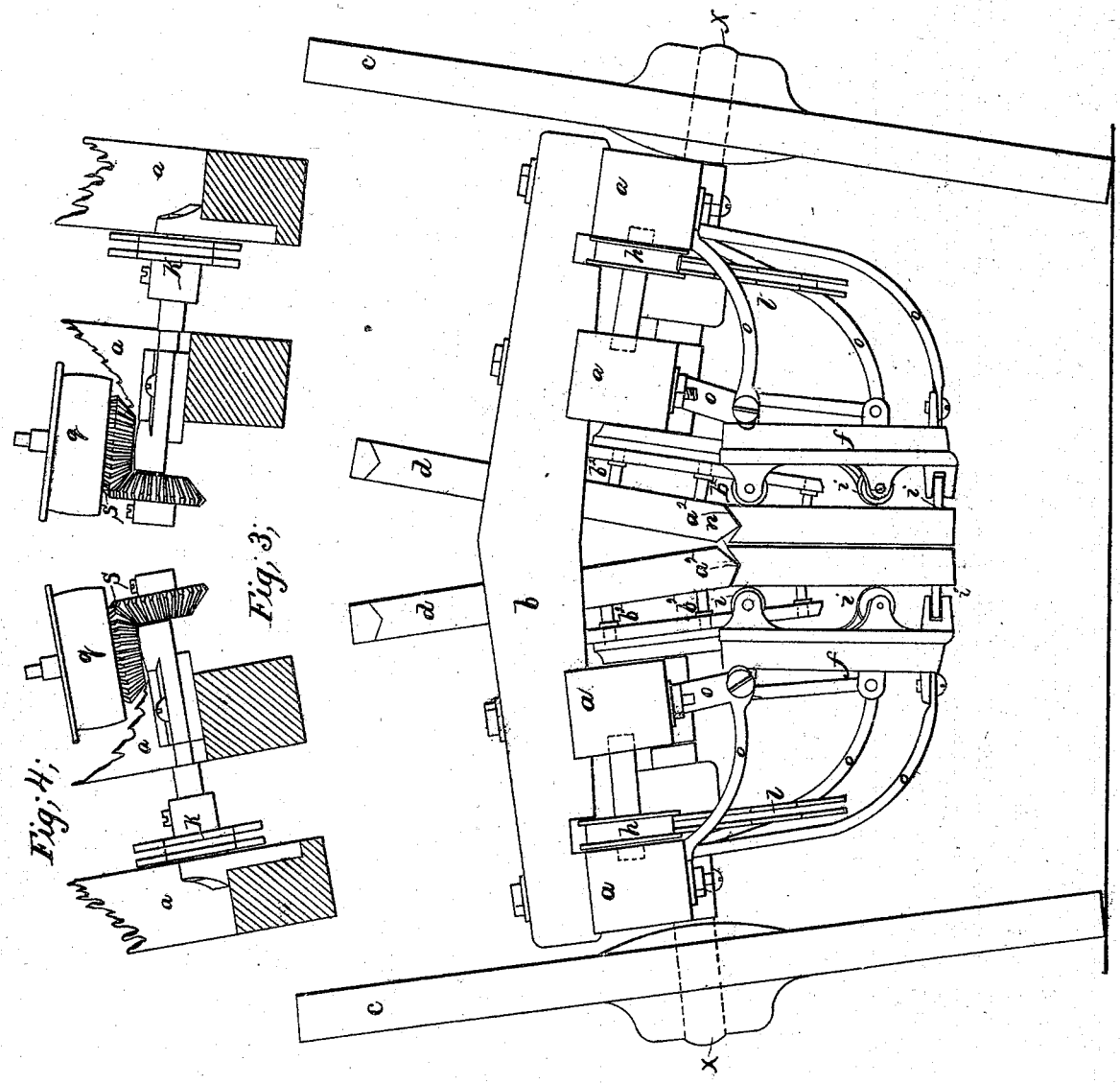

IMPROVEMENT IN MACHINE FOR PULLING HEMP AND COTTON STALKS.

ARTEMUS W. GODDARD, OF CLINTON, MASSACHUSETTS.

Letters Patent No. 60,359, dated December 11, 1866.

The Schedule referred to in these Letters Patent and making part of the same.

TO ALL WHOM IT MAY CONCERN:

Be it known that I, ARTEMUS W. GODDARD, of the town of Clinton, and county of Worcester, and State of Massachusetts, have invented new and useful Machinery for Pulling Hemp, Cotton Stalks, &c.; and I do hereby declare that the following is a full, clear, and exact description of the construction and operation of the same, reference being had to the annexed drawings, making a part of this specification, in which—

Figure 1 is a side view.
Figure 2 is a central vertical section.
Figure 3 is an end view.
Figure 4 is a detail view, to be hereafter referred to.

The present invention relates to new and useful machinery for pulling hemp, cotton stalks, &c., and consists—

1. In the use of two novel and peculiarly constructed wheels, so arranged and operated as to pull the stalks that come between them out of the ground, and drop them behind the machine.

2. In an arrangement of belts set with spur-teeth, so applied that the stalks shall retain their upright position while they are being pulled out of the ground.

There are also other arrangements in the detail and construction of the present machine which will be hereinafter referred to and more particularly described. In the accompanying plates of drawings I have represented my invention, reference being had to the same in the following description.

$a\ a\ a\ a$ represents the frame-work of the machine held together by the cross-timbers, $b\ b\ b$, and supported by the wheels $c\ c$. The wheels $d\ d$ are made in eight sections, $a^1\ a^1\ a^1\ a^1\ a^1\ a^1\ a^1\ a^1$, which are secured to the hub of said wheels, $d\ d$, by the studs $b^2$, and the sockets shown at $b^3$, fig. 2. The ends of the sections $a^1\ a^1$, in the felloes of the sectional wheels, $d\ d$, are held together by a V-shaped joint, as shown at $a^2$, fig. 3, or any other substantial device. The wheels $c\ c$ are the driving-wheels of the machine, and each half of the machine is complete in itself. The chain-wheels $l\ l$, on the shafts $x\ x$, figs. 1 and 3, by means of the chains $m\ m$, figs. 1 and 2, and the small chain-wheels, $k\ k$, figs. 1 and 4, and the mitre gears, $s\ s$, figs. 2 and 4, and belt-wheels, $q\ q$, figs. 1, 2, and 4, drive the spur-belts $e\ e$, figs. 1 and 2. The chains $m\ m$, figs. 1 and 2, pass from the chain-wheels $l\ l$, figs. 1 and 3, to and around the wheels $h\ h$, figs. 2 and 3, and under the small chain-wheels $k\ k$, figs. 1 and 4, said wheels, $k\ k$, receiving a continuous rotary motion by the chains $m\ m$. The adjustable sectional wheels, $d\ d$, figs. 1, 2, and 3, are made to run between the rollers $i\ i\ i$, fig. 3, set in the frames $f\ f$, which are so substantially attached to the machine that the wheels $d\ d$, from the point $g$, figs. 1 and 2, to the point $n$, figs. 1, 2, and 3, shall be made to run as near to each other as possible without binding. The roller frames, $f\ f$, figs. 1 and 3, are held in place by the braces $o\ o\ o\ o$, figs. 1, 2, and 3, secured to the frame-work of the machine in a proper manner. The spur-belts $e\ e$, figs. 1 and 2, are made to pass from the wheels $q\ q$, down the outside of the sectional wheels, $d\ d$, and between the two outside timbers, $a\ a$, of the machine, and around the rollers $r\ r$, then to the wheels $q\ q$, after passing between the wheels $d\ d$. The wheels $q\ q$ are operated by the mitre gears $s\ s$, which receive their motion from the small chain-wheels $k\ k$, said wheels $k\ k$ being operated by the chains $m\ m$, as hereinbefore described. The projecting bars $u\ u$ are for the purpose of gathering to the centre any stalks that may have fallen from a line of the perpendicular. The continuation of the same bar to the rear, figs. 1 and 2, and flattened at the end, $v$, is for the purpose of keeping the wheels $d\ d$ apart above the point $g$, so that there will be no difficulty in taking in the stalks to be pulled. The motive power is attached to the pole $w$.

Having described the manner in which the devices composing my machine are arranged, I will now proceed to describe how the same operate together.

The machine being set in motion, it will be seen that any stalks entering between the wheels $d\ d$, at the point $g$, will be held in that place until, by the forward motion of the machine, it shall have been carried to the rear, to the point $n$, where the rollers $i\ i\ i$ cease to have any effect on the wheels $d\ d$, and the stalk drops out behind to the ground. The spur-belts, $e\ e$, are made to run with the same speed in the direction of the arrow that the machine has in going forward, figs. 1 and 2. These belts are for the purpose of carrying to the rear the tops of the stalks, otherwise they would fall from the point $n$, figs. 1 and 2, back into the sectional wheels $d\ d$, thereby clogging the machine.

Having thus described my invention, I claim as new, and desire to secure by Letters Patent—

1. The sectional flexible wheels $d\ d$, of the form substantially as herein described, or their equivalent, arranged together and operated as described.

2. The spur-belts $e\ e$, for carrying the tops of the stalks to the rear, or their equivalent, substantially as described.

3. The rollers $i\ i\ i\ i$, and frames $f\ f$, for keeping the sectional flexible wheels together, arranged as and for the purpose specified.

4. The combination of the whole, consisting of the sectional flexible wheels $d\ d$, the spur-belts $e\ e$, the rollers $i\ i\ i\ i$, and the frames $f\ f$, arranged together as and for the purpose specified.

ARTEMUS W. GODDARD.

Witnesses:
   C. F. W. PARKHURST,
   GEORGE F. WRIGHT.